(12) United States Patent
Spierling

(10) Patent No.: US 8,575,900 B2
(45) Date of Patent: Nov. 5, 2013

(54) ROTOR BASED AIR GAP HEATING FOR AIR DRIVEN TURBINE

(75) Inventor: Todd A. Spierling, Byron, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 523 days.

(21) Appl. No.: 12/875,475

(22) Filed: Sep. 3, 2010

(65) Prior Publication Data

US 2012/0056601 A1 Mar. 8, 2012

(51) Int. Cl.
*H02P 11/00* (2006.01)

(52) U.S. Cl.
USPC .............................. 322/34; 322/33

(58) Field of Classification Search
USPC ............ 322/33, 34, 59, 60, 61; 219/213, 494, 219/497, 507, 202–203; 340/962, 580–583; 244/134 R, 134 A, 134 B, 134 C, 134 D
See application file for complete search history.

(56) References Cited

U.S. PATENT DOCUMENTS

| | | | |
|---|---|---|---|
| 4,982,123 A * | 1/1991 | Raad | 310/68 D |
| 5,321,308 A * | 6/1994 | Johncock | 290/40 C |
| 5,493,201 A * | 2/1996 | Baker | 322/10 |
| 5,746,580 A | 5/1998 | Parker | |
| 6,285,089 B1 * | 9/2001 | Nelson | 290/52 |
| 6,593,547 B1 * | 7/2003 | Raad | 219/201 |
| 6,918,294 B1 | 7/2005 | Roberge | |
| 6,979,979 B2 * | 12/2005 | Xu et al. | 322/59 |
| 6,990,797 B2 | 1/2006 | Venkataramani et al. | |
| 7,188,464 B2 | 3/2007 | Ackerman et al. | |
| 7,258,526 B2 | 8/2007 | Dooley et al. | |
| 7,323,667 B2 | 1/2008 | Dooley | |
| 7,374,404 B2 | 5/2008 | Schilling | |
| 7,592,786 B2 * | 9/2009 | Xu et al. | 322/59 |
| 2004/0080234 A1 | 4/2004 | Arel | |
| 2008/0093850 A1 * | 4/2008 | Taneja et al. | 290/36 R |
| 2008/0303490 A1 * | 12/2008 | Xu et al. | 322/29 |
| 2010/0134074 A1 * | 6/2010 | Crane | 322/79 |

FOREIGN PATENT DOCUMENTS

WO WO02086298 A2 10/2002

OTHER PUBLICATIONS

European Search Report, mailed Oct. 17, 2011.

* cited by examiner

*Primary Examiner* — Tulsidas C Patel
*Assistant Examiner* — Viet Nguyen
(74) *Attorney, Agent, or Firm* — Kinney & Lange, P.A.

(57) ABSTRACT

A generator apparatus comprises a deicing circuit. The deicing circuit is operable during a time when a main generator rotor is not being rotated by a generator shaft. The deicing circuit includes a first power source for energizing a plurality of exciter field windings with alternating input current to induce an exciter output current in a plurality of exciter armature windings. The exciter output current is provided to main generator rotor windings for producing resistance heating around an air gap separating the main generator rotor from a main generator stator.

20 Claims, 5 Drawing Sheets

ROTOR BASED AIR GAP HEATING FOR AIR DRIVEN TURBINE

BACKGROUND

This invention relates generally to ram air turbine assemblies, and more particularly to deicing systems for ram air turbine assemblies.

Air driven turbines are used to convert mechanical energy of passing air into other useful forms of energy. One such example for an air-driven turbine is a wind turbine that captures the energy of passing winds. The wind turbine, depending on the particular design, will directly or indirectly convert the energy of wind into electrical power.

Another example is the ram air turbine, which is deployed into a passing airstream from a moving body. Ram air turbines are well known in many fields, including as a supplementary or emergency power source for aircraft. For example, ram air turbines usually are coupled to one or more hydraulic pumps and/or electrical generators. They can be deployed automatically upon a predefined condition, such as upon loss of one or more main engines or generators that causes a loss of electrical power. Most turbines are also configured for manual deployment by the pilot or other crew member in the event that the automatic deployment signal is not received by the appropriate controller for releasing the turbine into the passing airstream.

Because of its nature, a ram air turbine on a particular aircraft is rarely if ever activated except during a real operational emergency. As such, additional measures are taken to ensure that the turbine is ready to be operated at a moment's notice. For example, such generators are prone to ice buildup in the air gap between the rotating assembly and the stationary assembly. This issue has previously been addressed by incorporating separate resistance heating elements. These elements and their circuitry add weight to an already rarely used device. As a separate system located close to the main stator windings of the ram air generator, they are not readily inspected or repaired without disassembly of the generator.

SUMMARY

A self-deicing generator apparatus comprises a stationary assembly, a rotating assembly, and a deicing circuit. The stationary assembly includes a main generator stator having a plurality of main generator stator windings, and an exciter stator having a plurality of exciter field windings. The rotating assembly includes a main generator rotor and an exciter rotor, both mounted to a shaft. The exciter rotor has a plurality of exciter armature windings disposed coaxially adjacent to the plurality of exciter field windings. The main rotor has a plurality of main rotor windings disposed coaxially adjacent to the plurality of main stator windings. The main rotor and the main stator are separated by an air gap. The deicing circuit is operable during a time when the main generator rotor is not being rotated by the shaft. The deicing circuit includes a first power source for energizing the plurality of exciter field windings with alternating input current. This is to induce an exciter output current in the exciter armature windings that is provided to the main generator windings for producing resistance heating around the main generator rotor windings. The resistance heating in the main generator rotor windings is produced to melt or sublimate a quantity of ice accumulated in the air gap.

A turbine module comprises a turbine assembly and a self-deicing generator assembly. The turbine assembly includes a turbine and a hub rotatably connected to a turbine shaft. The self-deicing generator assembly includes a deicing circuit operable during a time when a generator shaft is not rotating. The deicing circuit has a first external power source for energizing a plurality of exciter field windings with an alternating input current. The alternating input current energizes the exciter field windings to induce an exciter output current in a plurality of exciter armature windings. The exciter output current is provided to a plurality of main generator rotor windings disposed proximate an air gap between a main generator rotor and a main generator stator. The exciter output current is provided to the main generator rotor windings to cause resistance heating around the main generator rotor to melt or sublimate a quantity of ice accumulated in the air gap.

A method is disclosed for removing ice from an air gap of a generator assembly. The method comprises supplying an alternating current to a plurality of exciter field windings to induce an exciter output current in a plurality of substantially stationary exciter armature windings coaxially adjacent to the plurality of exciter field windings. The method also comprises directing the exciter output current to a plurality of substantially stationary main rotor windings disposed proximate the air gap to cause resistance heating. The resistance heating caused in the main rotor windings heats the air gap to a temperature sufficient to melt or sublimate a quantity of ice.

DETAILED DESCRIPTION

An electrical generator typically includes at least a main rotor mounted to a shaft, which rotates coaxially within a main stator. As is well known, the shaft is rotated by a fuel driven or air driven turbine, which turns a rotating assembly that includes the main rotor with a plurality of main rotor windings. The main rotor windings are energized by an exciter or other current source to generate a rotating magnetic field. The rotating magnetic field induces current in a plurality of main stator windings disposed around the main stator, which is secured to a stationary assembly. The current generated in the main stator windings power one or more electrical loads.

In some generators, such as those utilized in an aircraft ram air turbine ("RAT"), the main rotor and main stator are often separated by an air gap to facilitate cooling. This air gap may be annular or some other shape depending on the shape and orientation of the rotating assembly relative to the stationary assembly. Over each flight cycle, temperatures, and thus relative humidity and vapor pressures in the air gap vary significantly between the ambient ground conditions. When the aircraft is not flying, this air gap is regularly exposed to warm ground-level air having a relatively high moisture content, but at cruising altitudes of about 12,000 m (about 40,000 ft.), the ambient air temperature is about −40° C. (−40° F.) or less.

Warm ground-level air can seep into the air gap when the aircraft is not flying because the RAT module is not typically isolated fully from the outside environment. Deployment of the RAT module would quickly cause the ground-level air to be replaced with cooler, drier air because air is free to flow through the generator to the air gap. But, consistent with its purpose as a last failsafe emergency generator, the RAT module is rarely, if ever deployed. And once deployed, the RAT typically cannot be restowed until the aircraft is on the ground. Thus, there is insufficient time and opportunity after takeoff for humid air in the air gap to be replaced by cooler, drier air from upper levels of the atmosphere. As a result, the humid surface-level air in the gap is quickly cooled by the low temperatures present at higher altitudes, rendering the water vapor in the air gap prone to condensation and freezing. Absent other intervention, this condensation can freeze in the gap and can delay or completely prevent rotation of the turbine when it is deployed.

Figure 1:
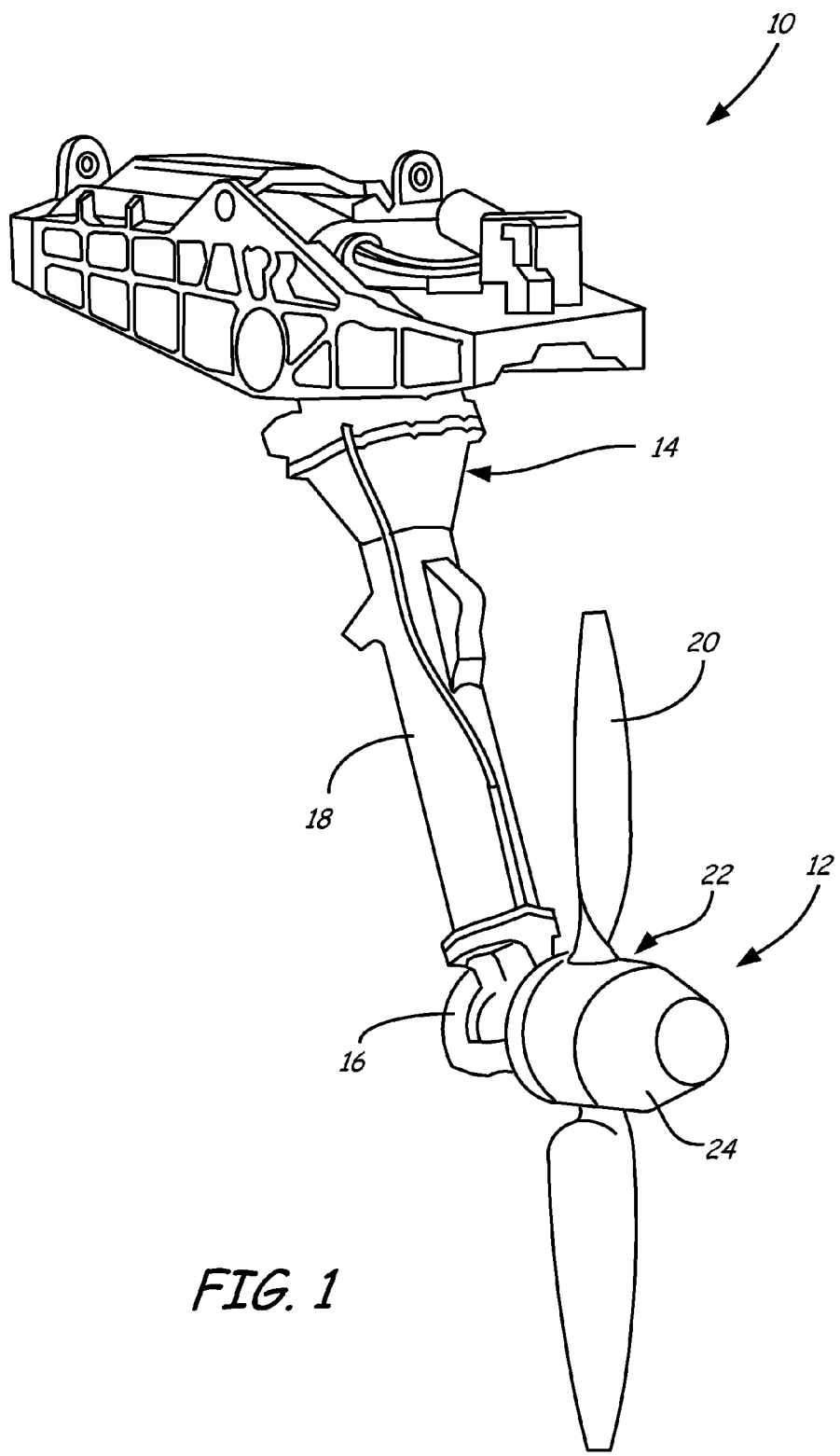
FIG. 1 schematically depicts a ram air turbine module in a deployed position, which includes a self-deicing generator assembly.

FIG. 1 is an example ram air turbine ("RAT") module 10, which includes turbine assembly 12, self-deicing generator assembly 14, gearbox 16, and strut 18. Turbine assembly 12 includes turbine 20, hub 22, and speed governor 24.

RAT module 10 includes turbine assembly 12 rotatably connected to self-deicing generator 14. Module 10 is an example of an air driven turbine generator, which captures and converts energy from passing air streams into electrical or hydraulic power. RAT module 10 is stowed in a bay of an aircraft (not shown), typically located toward the lower half of the aircraft fuselage, such as on the belly fairing or the wing fairing. Such locations are chosen to allow RAT module 10 to maximize energy capture from the passing air while remaining functional during critical flight sequences. However, RAT module 10 can be stored in other locations with access to a passing airstream and an aircraft power source without affecting operation of the invention described herein.

In this example, turbine assembly 12 and generator assembly 14 are operably connected by gearbox 16. Turbine 20 turns with the passing airstream. Speed governor assembly 24 is a spring or other apparatus that counters the angular momentum and changes the pitch of the blades to limit turbine 20 to a safe and efficient rotational speed. In this example, turbine 20 turns hub 22 and an internal turbine shaft (not shown) that rotatably couples to gearbox 16. Gearbox 16 then transfers the rotational energy of the turbine shaft to generator assembly 14 via one or more additional rotating shafts (not shown) disposed within strut 18. Multiple rotating shafts, as described above, provide a rotational speed to a generator shaft (shown in FIGS. 2A-2B) that corresponds to the operational range of generator assembly 14. It will be recognized that the invention as described herein can be used with virtually any RAT module with or without gearbox 16. For example, the turbine and generator shafts can be coupled directly without a gearbox or additional shafts.

RAT module 10 is deployed either automatically by the aircraft control system, or manually from the cockpit if the aircraft electrical distribution system is no longer receiving power from the main engine generator(s) or the auxiliary power unit(s). Once deployed, turbine 20 is intended to begin spinning from the force of the air stream and "spin up" generator assembly 14 via rotatable coupling with turbine assembly 12 described below. With the loss of engine power, electrical and/or hydraulic power is important to deploy the landing gears as well as to control aerodynamic surfaces like ailerons and wing flaps (not shown) to give the pilot a chance to make a relatively safe and controlled landing.

Since many modern aircraft are "fly-by-wire," RAT module 10 is effectively a final failsafe device to continue producing electrical and/or hydraulic power to operate critical aircraft equipment. As a failsafe device, it is critical that nothing impede starting and operation of RAT module 10. One impediment is ice accumulation in the air gap between the main rotor and the main stator. As described herein, the air gap can be heated while the rotor is not turning with a deicing circuit energizing the main rotor windings via the exciter.

Figure 2A:
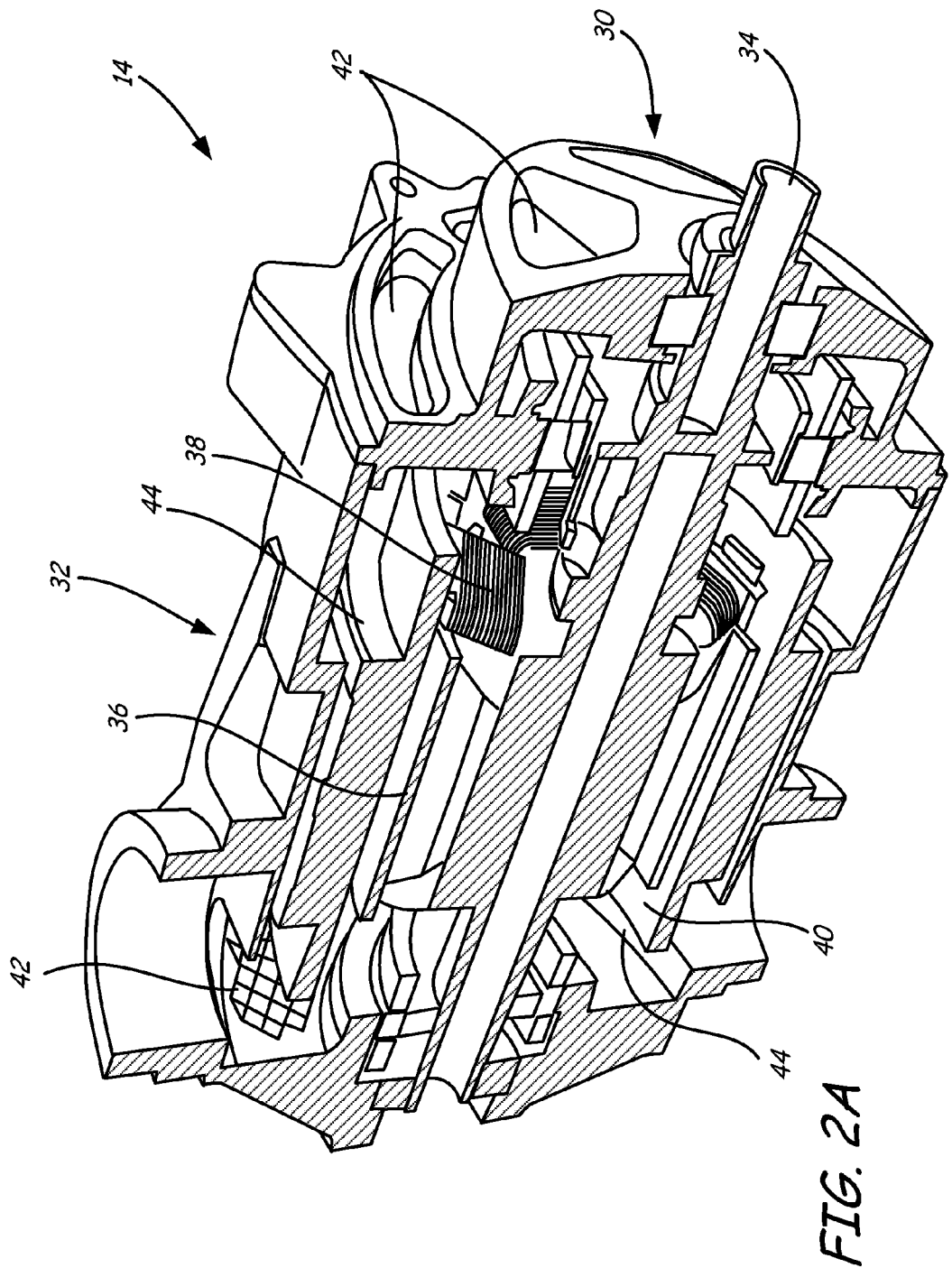
FIG. 2A is a perspective view of a cross-section of the self-deicing generator assembly, showing air gaps between a rotating section and a stationary section of the generator assembly.

FIG. 2A is a longitudinal cross-section of self-deicing generator assembly 14. Rotating assembly 30 includes generator shaft 34, main rotor 36, and main rotor windings 38. Stationary assembly 32 includes main stator 40. Both rotating assembly 30 and stationary assembly 34 include a plurality of cooling ports 42 and are separated by air gap 44. Generator assembly 14 has been rotated about 90° clockwise relative to the orientation in FIG. 1 to better illustrate air flow into and through air gap 44.

As is well known, a generator, such as generator assembly 14, induces current in main stator windings (not visible in FIG. 2A) disposed around main stator 40 by energizing rotor windings 38 disposed around main rotor 36, causing a magnetic field that rotates with generator shaft 34. Generator shaft 34 is turned via the rotational energy received from turbine assembly 12 as described with reference to FIG. 1.

When RAT module 10 is deployed, generator assembly 14 is cooled by directing air through cooling ports 42 into air gap 44, which includes the annular spaces between rotating assembly 30 and stationary assembly 32. Air is forced from the motion of the aircraft into ports 42 at the front of generator assembly 14. The air passes through several pathways, such as air gap 44 to cool various electrical components, including main rotor 36 and main stator 40. When RAT module 10 is stowed and the aircraft is on the ground, warm humid surface-level air also seeps into the RAT storage bay (not shown), and a portion of this air intrudes into air gap 44 through cooling ports 42. Since air can retain different quantities of water vapor at different temperatures and pressures, air gap 44 is prone to this retained water vapor that subsequently condenses and freezes as the aircraft reaches upper altitudes.

To remove this ice and prevent additional accumulation, generator assembly 14 can be operated on two different circuits, a generator circuit and a deicing circuit. The deicing circuit can be automatically activated when air gap 44 drops below a predefined temperature, or within a predefined time period after takeoff to prepare generator assembly 14 for operation as a generator. A generator circuit (shown in FIG. 3A) operates when RAT module 10 is deployed and generator shaft 34 is rotating from interaction with turbine 20. The deicing circuit (shown in FIG. 3B), utilizes many of the same components as the generator circuit with an external source of current and operates while RAT module 10 is stowed and/or generator shaft 34 is not turning. Many of these components are shown in more detail in FIG. 2B.

Figure 2B:
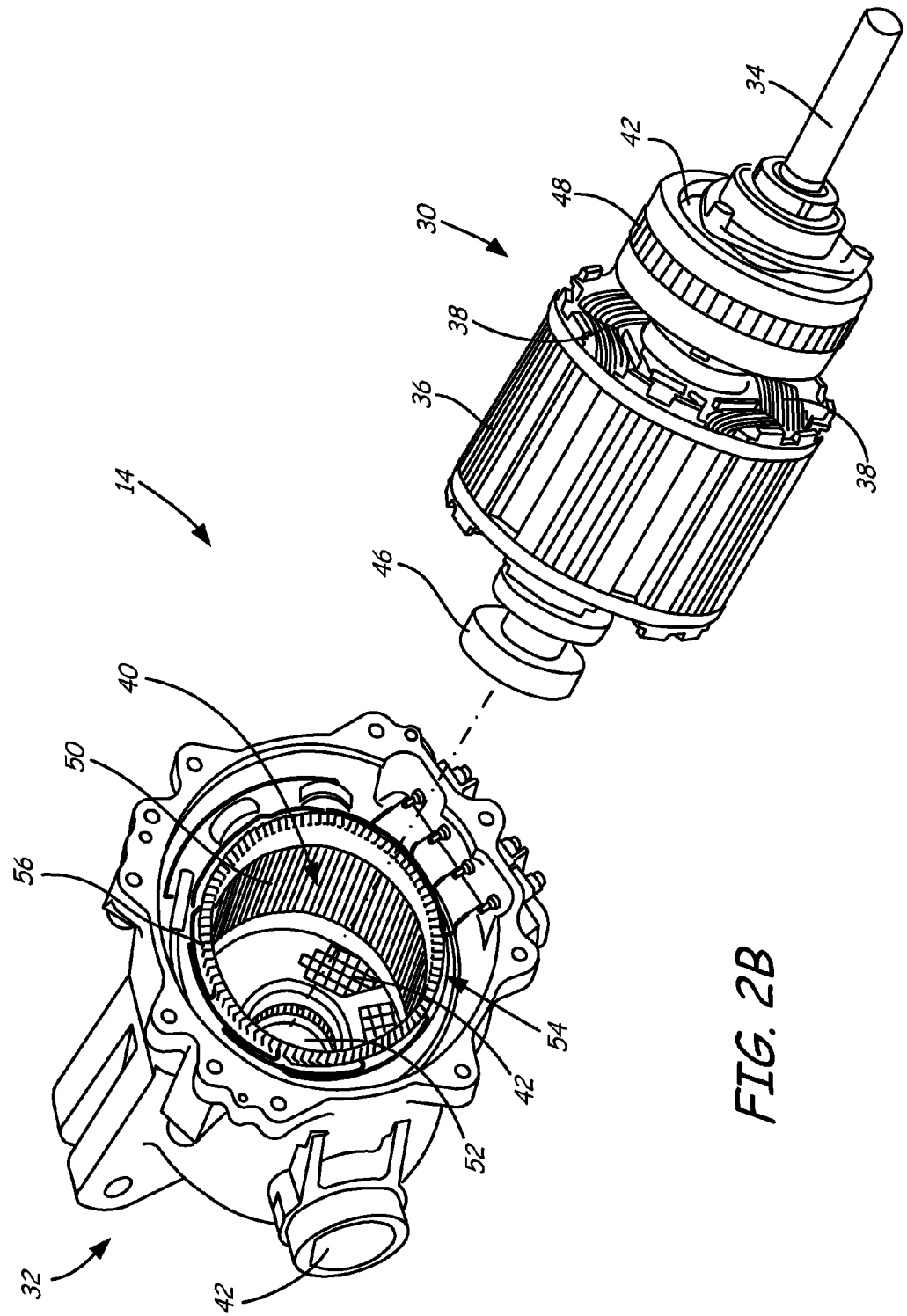
FIG. 2B is an exploded perspective view of the rotating assembly and the stationary assembly on the self-deicing generator assembly shown of FIG. 1.

FIG. 2B is an exploded perspective view of self-deicing generator assembly 14 having rotating assembly 30 and stationary assembly 32. Rotating assembly 30 includes generator shaft 34, main rotor 36, main rotor windings 38, permanent magnet generator ("PMG") rotor 46, and exciter rotor 48. Stationary assembly 32 includes main stator 40, main stator windings 50, PMG stator 52, exciter stator 54, and exciter field windings 56. Both rotating assembly 30 and stationary assembly 32 include a plurality of cooling ports 42. Because this is an exploded view, air gap 44 is not visible, but as noted above, it is located between main rotor 36 and main stator 40.

When self-deicing generator 14 is operating as a generator, it follows substantially the same mode of operation as a self-exciting three-phase AC generator. Rotating assembly 30 is turned by interaction with a turbine shaft coupled to generator shaft 34. In other embodiments of self-deicing generator 14, rotational energy of the turbine shaft can additionally or alternatively be provided from coupling generator shaft 34 to a fuel driven prime mover rather than an air-driven turbine.

A permanent magnet generator ("PMG") includes PMG rotor 46, mounted on rotating assembly 30, and PMG stator 52, installed at the rear of stationary assembly 32. Rotation of generator shaft 34 causes PMG rotor 46 to rotate, inducing PMG current in a plurality of windings (not visible in FIG. 2B) disposed around PMG stator 52. In this example, PMG stator 52 is coaxially adjacent to PMG rotor 46 and includes three sets of windings configured to produce three-phase PMG current. However, PMG stator 52 can include any winding configuration depending on power requirements for a particular exciter.

Figure 3A:
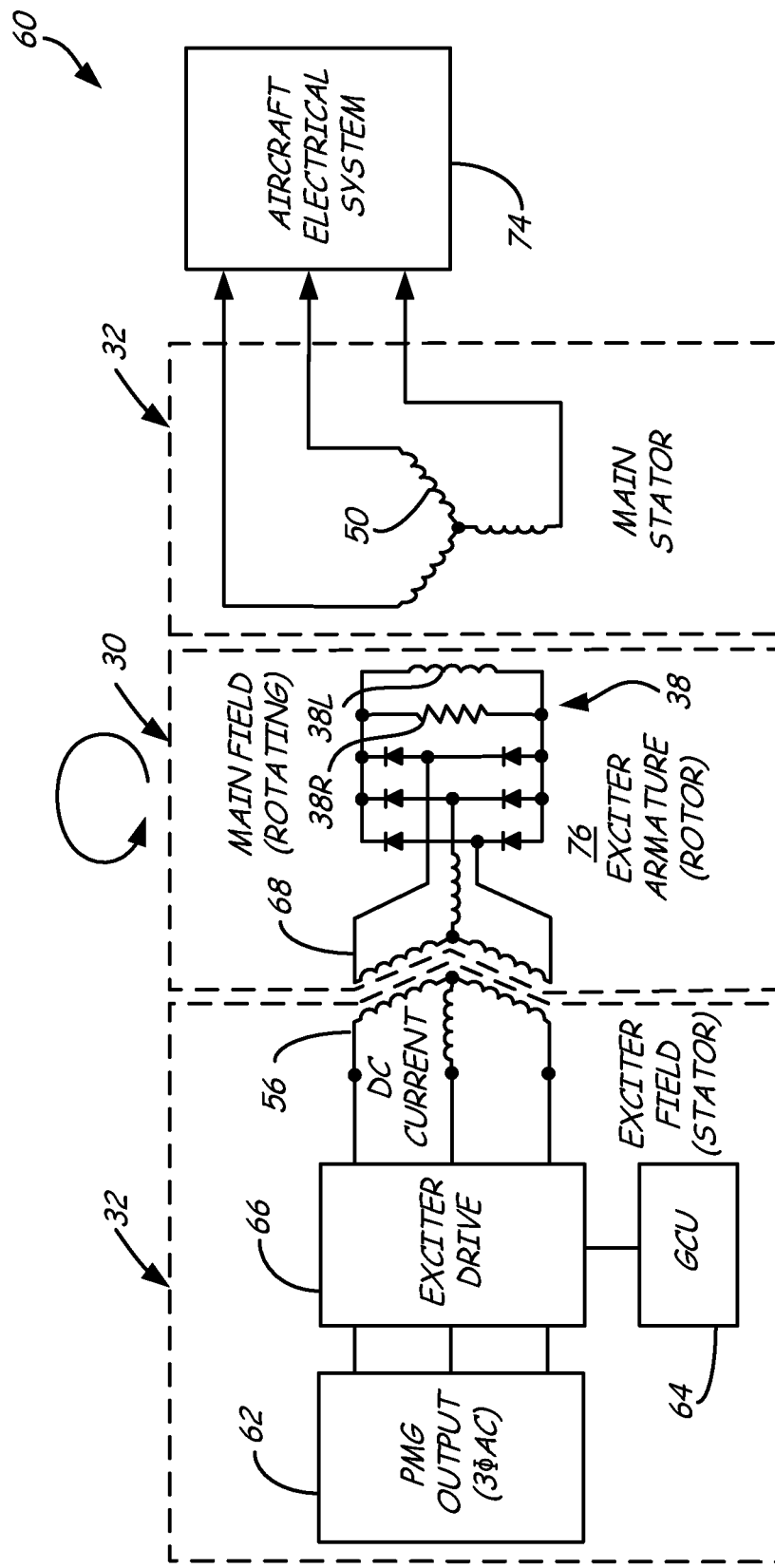
FIG. 3A is a simplified electrical schematic of a self-deicing generator assembly with a generator circuit.

This PMG current is fed to an exciter, which includes exciter rotor 48 coaxially adjacent to exciter stator 54. PMG current flow to the exciter can be regulated by an exciter drive, typically responding to signals from a generator control unit ("GCU"), as shown in FIG. 3A. Responding to these control signals, the exciter drive feeds a portion of the PMG current as needed to energize exciter field windings 56, disposed around exciter stator 54. The exciter drive and GCU can be mounted to stationary assembly 32, or any other suitable location.

As described below with reference to the diagram of generating circuit 60 (shown in FIG. 3A), the three-phase PMG current can be rectified before energizing exciter field windings 56. This exciter input current then induces a stationary magnetic field around exciter field windings 56, which passes through rotating assembly 30 proximate exciter rotor 48. A plurality of exciter armature windings (not visible in FIG. 2A) are disposed around exciter rotor 48, and pass though this exciter magnetic field when assembly 14 is operational as a generator with generator shaft 34 rotating. This interaction between the rotating exciter armature windings and the exciter magnetic field induces an alternating output current in the exciter armature windings around exciter rotor 46, as seen in the simplified electrical diagram of FIG. 3A. As discussed below, in certain alternative embodiments, exciter field windings 56 can be energized with one or more phases of alternating current from PMG stator 52.

The exciter output current energizes main rotor windings 38, also shown in FIG. 3A. For example, this alternating output current can exit the exciter armature windings as three-phase alternating current, and be subsequently rectified before powering main rotor windings 38. Energizing main rotor windings 38 with direct current from the exciter output induces a magnetic field, which rotates along with rotating assembly 30 around main rotor 36. This rotating magnetic field induces current in main stator windings 50 disposed circumferentially around main stator 40.

In this example, main stator windings 50 are configured in three sets to generate three-phase alternating current for the aircraft system as shown in FIG. 3A. Also in this example, main rotor 36 includes six poles, and main stator includes seventy-two arms. However, any number of rotor poles, stator arms, and stator winding phases can be utilized based on the power requirements for a particular RAT module or other generator.

Figure 3B:
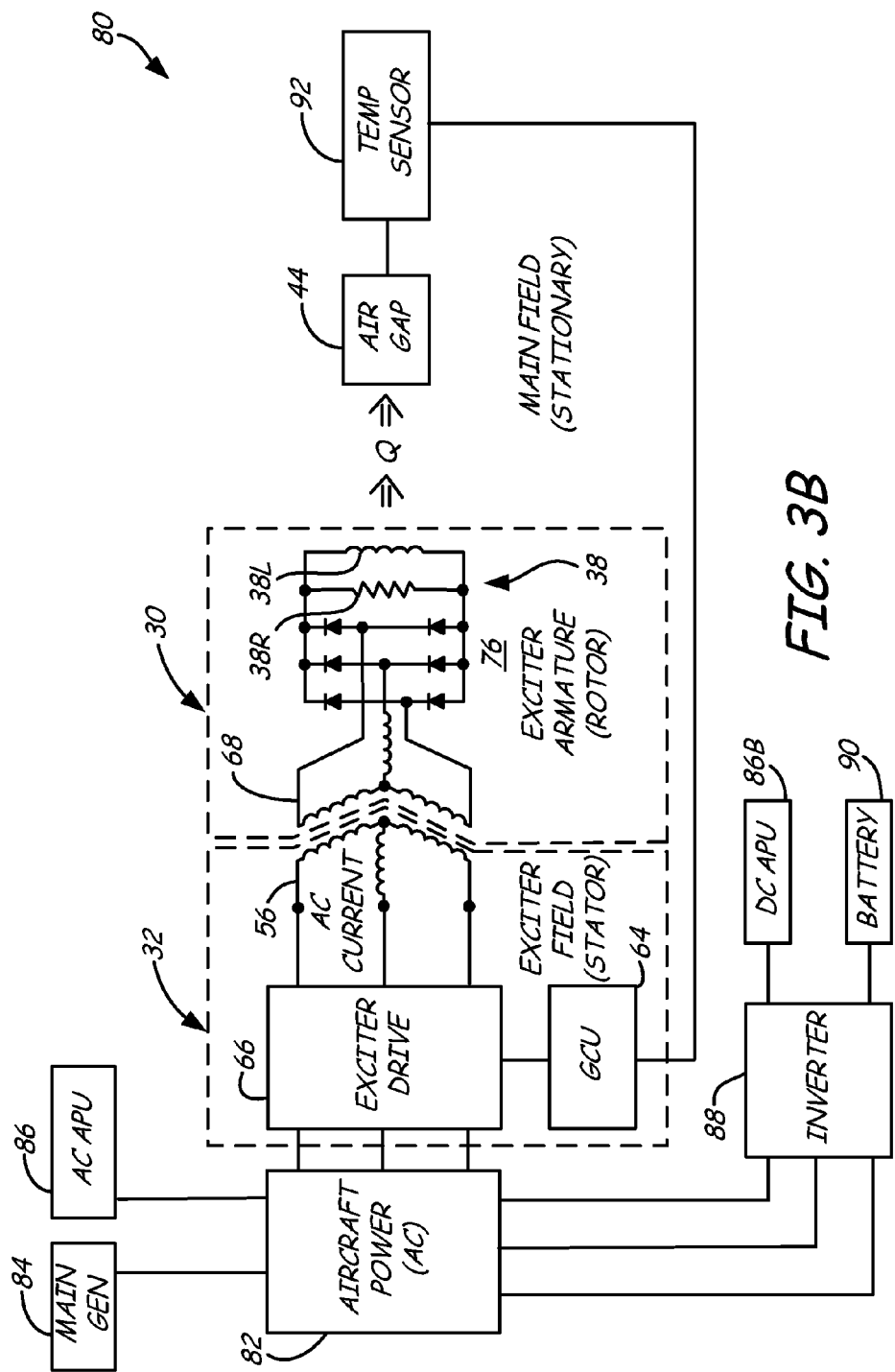
FIG. 3B is a simplified electrical schematic of a self-deicing generator assembly with a deicing circuit.

As described above, air gap 44 can be prone to condensation and ice accumulation, which interferes with low temperature operation of RAT module 10. Thus, generator assembly 14 and/or RAT module 10 can be modified to include a deicing circuit to energize main rotor windings 38 during a time while rotating assembly 30 is not turning, such as while RAT module 10 is stowed. Energizing main rotor windings 38 generates resistive heat adjacent to air gap 44 using only the elements typically found in a generator, eliminating the need for separate resistance heaters. FIGS. 3A and 3B are simplified electrical diagrams for self-deicing generator assembly 14 with generating circuit 60 and deicing circuit 80.

FIG. 3A includes a simplified diagram of generating circuit 60 operable when rotating assembly 30 is turning relative to stationary assembly 32 (which is shown in two parts in FIG. 3A). Rotating assembly 30 includes main rotor field windings which are represented by inductive component 38L and resistive component 38R, exciter armature windings 68, and main rotor rectifier 76. Stationary assembly includes main stator windings 50, exciter field windings 56, PMG output 62, GCU 64, exciter drive 66, and aircraft electrical system 74.

As seen in FIG. 3A, generator circuit 60 is similar to a standard self-exciting electrical generator circuit. Generator circuit 60 is operational when rotating assembly 30 is being rotated by shaft 34 as described above. Exciter field windings 56 are energized with current from PMG output 62 via GCU 64 and exciter drive 66. Control signals are issued by GCU 64 directing exciter drive 66 to selectively and periodically energize exciter field windings 56, regulating the output voltage of generator assembly 14 to aircraft electrical system 74.

Continuing with generator circuit 60, exciter field windings 56 receive current from exciter drive 66 fed from PMG 62. In this example of generator circuit 60, PMG 62 outputs three-phase alternating current, which then goes to exciter drive 66. Here, before exciter field windings 56 receive current from exciter drive 66, the PMG alternating current is rectified to direct current. This can be done by exciter rectifier circuitry similar to main rotor rectifier 76. Rectifying circuitry can be disposed within the assembly for exciter drive 66 or between the assembly for drive 66 and exciter field windings 56. Providing direct current to one or more sets of exciter field windings 56 can simplify operation of generator circuit 60. This is due in part to the relative simplicity of producing a stable magnetic field with direct current across exciter armature windings 68. However, it will be recognized that in certain applications, generator circuit 60 can alternatively energize exciter field windings 56 with alternating current.

Energizing exciter field windings 56, located on exciter stator 54, induces at least one magnetic field radially across exciter rotor 48 (shown in FIGS. 2A-2B). Exciter armature windings 68 are disposed around exciter rotor 48, which is coaxially adjacent to exciter stator 54, also shown with reference to FIGS. 2A-2B. Three-phase alternating current is then induced in exciter armature windings 68 as exciter rotor 48 rotates through the magnetic field generated by energized exciter field windings 56. This three-phase alternating output current then goes through main rotor rectifier 76, energizing main generator rotor windings 38 with rectified (direct) exciter output current.

Main generator rotor windings 38 include a resistive component 38R and an inductive component 38L, with the rectified exciter output current flowing through each. Resistive component 38R represents the losses due to resistance of current flow through main rotor windings 38. Current flowing through inductive component 38L generates a magnetic field. Rotation of main rotor windings 38 by turning of rotating assembly 30, in turn causes the magnetic field to rotate about main rotor 36, inducing output current in main stator windings 50 as shown and described relative to FIGS. 2A-2B.

Since electrical devices are configured to operate in limited voltage and frequency ranges, exciter drive 66 controls the generator output voltage to match the main electrical system. This is done by regulating the current going to exciter field windings 56. For example, many aircraft utilize a three-phase $115 V_{ac}$ or $230 V_{ac}$ distribution system, and in such an aircraft, exciter drive 66 provides current to windings 56 in order to maintain the output voltage near those target values. Frequency of the output current sent to aircraft system 74 can be controlled by configuring gearbox 16 (shown in FIG. 1) to turn rotating assembly 30 at a rate approximating the target frequency. In this example, the target frequency is 400 Hz. Alternatively, the main generator output current can be rectified before inclusion in aircraft for utilization in a direct current distribution system.

As shown in FIG. 3A, main rotor windings 38 include resistive component 38R, which generates substantial heat when generator circuit 60 is operational. Since generator circuit 60 is operational during a time that generator shaft 34 is spinning the rotating assembly 30, this heat is readily dissipated through cooling ports 42 shown in FIGS. 2A-2B. A small amount of heat from resistive component 38R would be useful to heat and deice air gap 44. However in a typical ram air turbine or other air driven generator, resistive component 38R generates electricity, and thus heat, only with rotation of generator shaft 34. The typical generator does not have or need a separate current source to power the exciter when the rotor is stationary.

FIG. 3B illustrates deicing circuit 80, which can be activated during a time while rotating assembly 30 and components secured thereto are not turning relative to stationary assembly 32. FIG. 3B includes a simplified electrical diagram of deicing circuit 80 operable when rotating assembly 30 is not turning relative to stationary assembly 32. Rotating assembly 30 includes main rotor field windings 38, exciter armature windings 68, and main rotor rectifier 76. Stationary assembly includes exciter field windings 56, GCU 64, and exciter drive 66. Power is provided via external aircraft power supply 82. External power supply 82 is selectively electrically connected to AC sources including main aircraft generator 84 and AC auxiliary power unit ("APU") 86, and to DC sources via three-phase inverter 88. Example DC sources include DC APU 86B and battery 90. The temperature in air gap 44 is measured by temperature sensor 92. Main field windings 38R emit heat Q toward air gap 44.

In contrast to FIG. 3A, deicing circuit 80 can be activated while generator shaft 34 is not turning the rest of rotating assembly 30. As described above, ice accumulation in and around air gap 44 can be prevented and/or removed by heating and increasing water retention capacity of the surrounding air. Deicing circuit 80 directs alternating current from aircraft power supply 82 to energize exciter field windings 56. Transformer action then induces a corresponding alternating current in exciter armature windings 68. In this example, the three-phase alternating exciter output current then flows through main rotor rectifier 76 and energizes main rotor windings 38 with direct current. Due to the resistance component 38R of the main windings 38, current flow through main rotor windings 38 will produce heat around main rotor 36, thereby reducing or limiting ice accumulation in and around air gap 44.

In deicing circuit 80, the current flow and voltage through main rotor windings 42 can be regulated using GCU 64 and exciter drive 66. GCU 64 issues control signals to exciter drive 66, which then provides the necessary alternating current to one or more exciter field windings 56. Alternatively, deicing circuit 80 can include a small amount of continuous current applied directly to exciter field windings 56 from aircraft source 82, bypassing exciter drive 66.

In this example, the alternating input current for exciter field windings 56 is provided from an aircraft AC source 82. Several example sources include main aircraft generator 84 and alternating current APU 86. In this example, these both generate three-phase alternating current which is distributed throughout the aircraft. The source of power will depend in part on which sources are functional and at which stage of flight that deicing circuit 80 is activated. For example, if deicing circuit 80 is activated while the aircraft is on the ground and the engines have not yet been started, alternating input current for exciter field windings 56 will at least initially be provided partially or completely by inverter 88 using sources of direct current, such as DC APU 86B or battery 90.

The temperature in air gap 44 can be measured and a signal sent by temperature sensor 92 to GCU 64. GCU 64 can be programmed to regulate the amount of current sent to exciter field windings 56, which increases or decreases the resistive heating in main rotor windings 38. Temperature sensor 92 can be disposed in or proximate air gap 44 in order to accurately and efficiently maintain a predetermined temperature range in or proximate air gap 44. For example, GCU 64 can compare measurement signals from temperature sensor 92 to the predetermined range, and in response, regulate the alternating input current sent to exciter field windings 56 by controlling exciter drive 66. In this example, the current sent to windings 56 can be regulated by GCU 64 such that main rotor windings 38 are energized with the minimum amount of current required to maintain the temperature of air gap 44 within a predetermined range. The range can be selected to melt or sublimate any possible ice accumulated during the flight. GCU 64 can also be programmed to choose from different temperature ranges depending on particular flight conditions.

It will be recognized that this configuration of deicing circuit 80 shares some similarities with a variable frequency starter-generator. With high enough alternating currents induced in exciter armature windings 68, there is a risk that rotating assembly 30 will turn while RAT module 10 is still stowed, possibly damaging one or more parts.

However, there are several elements reducing the likelihood of damage. First, deicing circuit 80 provides current with relatively low amperage to main generator rotor windings 38. In traditional generators with separate resistance heaters, sufficient heating and deicing is provided at a maximum current flow of about 1 to 5 amperes. This will vary based on the size of a RAT module 10 for a particular aircraft, but a similar magnitude of current through main rotor windings 38 will generally be sufficient for most deicing and heating functions. In contrast, a starter-generator often requires tens or hundreds of amperes through the exciter windings to turn the entire rotating assembly.

It will be recognized that generator assembly 14 can include one or more relays or switches to change back and forth between generator circuit 60 and deicing circuit 80 as needed. In addition, in certain embodiments, the gearbox or other means for transferring rotational energy between turbine 20 and generator rotating assembly 30 (shown in FIGS. 1 and 2A-2B) can be locked or disabled by a signal from GCU 64 when deicing circuit 80 is activated. Generator shaft 34 can be selectively locked, such as by a locking pin or pawl disposed in or proximate gearbox 16. Similarly, generator shaft can be selectively disengaged or provided with a fluid transfer coupling in gearbox 16 to limit any ancillary rotational motion caused by the transformer action between exciter field windings 56 and exciter armature windings 68.

By energizing exciter field windings 56 with aircraft alternating current source 82, main rotor windings 38 can be energized even when generator shaft 34 is not rotating, thus providing heating around air gap 44 from resistive component 38R. In a standard generator, exciter field windings 56 are only powered when receiving current from the PMG. And the PMG is only producing current when generator shaft 34 is turning rotating assembly 30 as shown in FIGS. 2A-2B. The PMG cannot provide current when turbine 20 is immobilized, such as when RAT module 10 is stowed or ice in air gap 44 restricts motion of rotating assembly 30.

Further, standard self-exciting generators use DC excitation and are not configured to accept alternating current in exciter field windings 56. In such generators, direct current applied to exciter field windings 56 cannot power exciter armature windings 68, because armature windings 68 are not rotating and do not pass through any magnetic fields. Thus, in a standard generator, exciter armature windings 68 cannot provide current to generate heat in main rotor resistive windings 38R.

Air gap 44 has traditionally been heated using electrical resistance tape or other separate resistance heaters disposed in and around main stator 40 or other adjacent surfaces. This separate resistance heater adds additional weight and complexity to a system that is already dead weight for most flights. Having a separate component solely to prevent and remove ice accumulation also increases the risk that RAT module 10 will be inoperative when it is needed the most. Since ram air turbines are often designed to deploy only under the most critical flight situations, such as during a total loss of electrical and/or engine power, they are rarely deployed or even tested during actual flight conditions. Without regular testing or verification, it may be impossible to determine whether the separate heater is indeed ready and able to performing its duties. Further, some separate heaters are wound or otherwise disposed in or near main stator 40, and can be difficult to service or replace. Instead, deicing circuit 80 can greatly simplify wiring, manufacturing, and control of the RAT generator system.

In addition, providing resistance heating proximate main generator rotor 36 improves the efficiency of heating and deicing air gap 44 as compared to heating areas proximate main stator 40 (shown in FIGS. 2A-2B). Heat produced proximate main rotor 36, such as in main rotor windings 38, is more likely to be retained around air gap 44 for a longer time than heat produced in separate resistance elements disposed around main generator stator 40. This is due to the closer proximity of main rotor windings 38 to the center of generator 14, limiting paths for the generated heat to escape into the surrounding air.

Further, heating main rotor windings 38 directly with aircraft power, or by including separate resistance heating elements on main rotor 36, would require slip rings or commutators to transfer the power from stationary assembly 32 to rotating assembly 34. Such components are inconsistent with a self-exciting generator assembly, and would unnecessarily complicate its operation. In self-deicing generator assembly 14, deicing circuit 80 can be included with only slight modifications to a standard generator design. These modifications include configuring exciter field windings 56 to conduct alternating current, and by designing or modifying GCU 64 and exciter drive 66 to provide this alternating current from an external aircraft source 82.

In addition to RAT modules, these circuits can be adapted to other generators and turbine modules, such as wind turbine generators. They can be adapted to generators subject to condensation or sublimation of water vapor and ice accumulation in the air gap, as well.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A self-deicing generator apparatus comprising:
an air-driven turbine including a turbine hub;
a generator shaft rotatably coupled to the turbine hub;
a stationary generator assembly including a main generator stator having a plurality of main generator stator windings, and an exciter stator having a plurality of exciter field windings;
a rotatable assembly including a main generator rotor and an exciter rotor mounted to the generator shaft, the exciter rotor having a plurality of exciter armature windings disposed coaxially adjacent to the plurality of exciter field windings, and the main generator rotor having a plurality of main rotor windings disposed coaxially adjacent to the plurality of main stator windings, the main generator rotor and the main generator stator separated by an air gap; and
a deicing circuit operable during a time when the rotatable assembly is not being rotated by the generator shaft, the deicing circuit including a first power source for selectively energizing the plurality of exciter field windings with an alternating input current, the alternating input current inducing an exciter output current in the exciter armature windings that is provided to energize the main rotor windings for producing resistance heating around the main generator rotor to melt or sublimate a quantity of ice accumulated in the air gap.

2. The generator apparatus of claim 1, wherein the first power source is an aircraft electrical power distribution system that provides three-phase alternating current.

3. The generator apparatus of claim 2, wherein the aircraft electrical power distribution system is configured to receive power from at least one of: a main aircraft electrical generator, and an auxiliary power unit.

4. The generator apparatus of claim 2, wherein the aircraft electrical power distribution system receives power from an inverter electrically connected to a direct current power source.

5. The generator apparatus of claim 1, wherein the first power source is an aircraft electrical distribution system operating with direct current, and the direct current is converted into three-phase alternating current by an inverter.

6. The generator apparatus of claim 1, wherein the induced exciter output current comprises three-phase alternating output current rectified into direct current before energizing the main rotor windings.

7. The generator apparatus of claim 1, further comprising a generator control unit for regulating the alternating input current selectively energizing the plurality of exciter field windings.

8. The generator apparatus of claim 1, further comprising:
a second power source for energizing the plurality of exciter field windings as part of a generating circuit, the generating circuit operable during a time when the rotatable assembly is being rotated by the generator shaft.

9. The generator apparatus of claim 8, wherein the second power source is a permanent magnet generator.

10. The generator apparatus of claim 8, wherein current from the second power source is rectified before energizing the plurality of exciter field windings.

11. A turbine module comprising:
a turbine assembly including an air-driven turbine with a turbine hub, the turbine hub rotatably connected to a turbine shaft;
a generator shaft rotatably coupled to the turbine shaft;
a self-deicing generator assembly including a rotor assembly mounted to the generator shaft, and a stator assembly coaxially spaced from the rotor assembly by an air gap, the rotor assembly having a plurality of main rotor windings and a plurality of exciter armature windings, the stator assembly having a plurality of main stator windings disposed coaxially adjacent to the plurality of main rotor windings, and a plurality of exciter field windings spaced coaxially from the plurality of exciter armature windings; and
a deicing circuit operable during a time when the generator shaft is not being rotated by the turbine shaft, the deicing circuit including a first power source for energizing the plurality of exciter field windings with an alternating input current to induce an exciter output current in the plurality of exciter armature windings, the induced exciter output current from the exciter armature windings provided to energize the plurality of main rotor windings disposed proximate the air gap, the energized main rotor windings causing resistance heating around the main rotor windings to melt or sublimate a quantity of ice accumulated in the air gap.

12. The turbine module of claim 11, wherein the first power source is an aircraft electrical power distribution system for providing three-phase alternating current.

13. The turbine module of claim 12, wherein the aircraft electrical power distribution system receives power from at least one of: a main aircraft electrical generator, and an auxiliary power unit.

14. The turbine module of claim 11, wherein the induced exciter output current comprises three-phase alternating output current rectified into direct current before energizing the main rotor windings.

15. A method for removing ice from an air gap of a generator assembly, the method comprising:
operating a deicing circuit during a time that a rotatable assembly is not being rotated by a generator shaft, the operating step including supplying an alternating input current from a first power source to selectively energize a plurality of exciter field windings to induce an exciter output current in a plurality of substantially stationary exciter armature windings coaxially adjacent to the plurality of exciter field windings; and
directing the induced exciter output current to energize a plurality of substantially stationary main rotor windings disposed proximate the air gap;
during the steps of supplying an alternating input current and directing the induced exciter output current, maintaining the energized rotor windings in a substantially stationary position to cause resistance heating that heats the air gap to a temperature sufficient to melt or sublimate a quantity of ice disposed therein.

16. The method of claim 15, wherein the first power source comprises an aircraft electrical distribution system operating with three-phase alternating current.

17. The method of claim 16, wherein the aircraft electrical distribution system receives power generated from at least one of: a main aircraft generator and an auxiliary power unit.

18. The method of claim 15, wherein the first power source comprises an inverter electrically connected to an aircraft electrical distribution system operating with direct current.

19. The method of claim 15, further comprising the steps of:
periodically measuring the temperature in or proximate the air gap;
comparing the measured temperature to a predetermined temperature range; and
selectively regulating the alternating input current supplied to the plurality of exciter field windings to maintain the measured temperature within the predetermined temperature range.

20. The method of claim 19, wherein a generator control unit selectively regulates the alternating input current supplied to the plurality of exciter field windings.

* * * * *